United States Patent [19]

Petersen et al.

[11] Patent Number: 5,730,777
[45] Date of Patent: Mar. 24, 1998

[54] METHOD AND APPARATUS FOR PERFORMING OPERATIONS

[75] Inventors: Peter Mosborg Petersen, Århus; Jan Alexander Villadsen, Koldinggade 31., 1.tv., DK-2100 Copenhagen Ø; Peter Ebbesen, Søsterhøvej 36, DK-8270 Højbjerg, all of Denmark

[73] Assignees: Peter Mosborg Peterson; Jan Alexander Villadsen, both of Arhus; Peter Ebbesen, Hojbjerg, all of Denmark

[21] Appl. No.: 569,204

[22] PCT Filed: Jul. 15, 1994

[86] PCT No.: PCT/DK94/00287

§ 371 Date: Apr. 15, 1996

§ 102(e) Date: Apr. 15, 1996

[87] PCT Pub. No.: WO94/19922

PCT Pub. Date: Sep. 15, 1994

[30] Foreign Application Priority Data

Jul. 16, 1993 [DK] Denmark ............... 850/93

[51] Int. Cl.⁶ .................................................. B01D 53/22
[52] U.S. Cl. ............ 95/12; 95/22; 95/25; 95/45; 95/273; 96/4; 55/270; 55/274; 55/310; 55/385.2; 55/419; 55/467
[58] Field of Search ............... 95/8, 12, 19, 22, 95/23, 25, 43, 45, 273, 291; 96/4, 108; 55/210, 270, 274, 310, 385.1, 385.2, 418, 419, 467, 471, 472

[56] References Cited

U.S. PATENT DOCUMENTS

| | | | |
|---|---|---|---|
| 3,251,139 | 5/1966 | Strimmling | 34/54 |
| 3,265,059 | 8/1966 | Matthew | 128/1 |
| 3,334,597 | 8/1967 | Ruskin et al. | 55/385.2 X |
| 3,356,254 | 12/1967 | Becker | 220/85 |
| 3,777,736 | 12/1973 | Van Der Waaij et al. | 55/385.2 X |
| 4,026,286 | 5/1977 | Trexler | 128/204 |
| 4,435,194 | 3/1984 | Picard et al. | 95/19 |
| 4,530,272 | 7/1985 | Stokes | 95/12 X |
| 5,022,794 | 6/1991 | Martin | 406/171 |
| 5,074,894 | 12/1991 | Nelson | 95/22 X |
| 5,316,518 | 5/1994 | Challenger | 55/385.2 X |
| 5,360,371 | 11/1994 | Bartimote | 55/385.2 X |

FOREIGN PATENT DOCUMENTS

| | | | |
|---|---|---|---|
| 0 554 117 | 8/1993 | European Pat. Off. | |
| 1 282 653 | 1/1962 | France | |
| 62-38248 | 2/1987 | Japan | |
| 62-213629 | 9/1987 | Japan | |
| 63-079675 | 4/1988 | Japan | 95/273 |
| 1 201 748 | 8/1970 | United Kingdom | |
| 92/21920 | 12/1992 | WIPO | |

OTHER PUBLICATIONS

Chapman, "The Detection And Measurement Of Hyposic Cells in Solid Tumors", *Cancer*, vol. 54:2441–2449, (1984).

(List continued on next page.)

*Primary Examiner*—Robert Spitzer
*Attorney, Agent, or Firm*—Foley & Lardner

[57] ABSTRACT

A method for performing a function or an operation involving a material, in particular, a non-gaseous material such as a biological material subjected to a scientific investigation, under a gaseous atmosphere in a closed chamber comprising performing the operation in a housing comprising i) first chamber walls defining a first chamber containing a gaseous atmosphere and ii) second chamber walls defining a second chamber substantially enclosing the first chamber, the second chamber containing a gaseous atmosphere between the first and second chamber walls, the operation being performed in the first chamber while a) the partial pressure of the selected gas species or the total gas pressure in the atmosphere of the second chamber is lower than the partial pressure of the selected species of the total gas pressure, respectively, of the gaseous atmosphere in an adjacent outer third chamber or space. The invention also relates to a housing for performing the operation mentioned above.

54 Claims, 3 Drawing Sheets

OTHER PUBLICATIONS

Clark et al., "How Large Is The Drop In $PO_2$ Between Cytosol and Mitochondrion", *Am. J. Physiol.*, 252 (Cell Physiol. 21):C583–C587, (1987).

Derrick et al., "Oxygen Tensions In Tissues", *Arch. Surg.*, (Chicago) vol. 88:1059–1062, (1964).

Ebbesen et al., "In Vitro Interferon And Virus Production At In Vivo Physiologic Oxygen Tensions", *In Vivo*, vol. 5:355–358, (1991).

Ebbesen et al., "Physiological Oxygen Tension Is Relevant To MHC–1 Expression, Spontaneous Transformation, And Interferon Response of in Vitro Aging Murine Fibroblasts", *Experimental Gerontology*, vol. 28:573–578, (1993).

Gayeski et al., "Minimum Intracellular $PO_2$ for Maximum Cytochrome Turnoer In Red Muscle In Situ", *Am. J. Physiol.*, vol. 252:H906–H915, (1987).

Hochachka, "Defense Strategies Against Hyposia And Hypothemia", *Science*, vol. 231:234–241, (1986).

Jones, "Intracellular Diffusion Gradients of $O_2$ and ATP", *Am. j. Physiol.*, vol. 250 (Cell Physiol. 19):C663–C675, (1986).

Thiele et al., "Lethal Graft–VS–Host Disease Across major Histocompatibility Barriers: Requirement For Leucyl–Leucine Methyl Ester Sensitive Cytotoxic T Cells", *The Journal Of Immunology*, vol. 138(1):51–57, (1987).

Loeffler et al., "Natural Killer–Cell Activity Under Conditions Reflective of Tumor Micro–Environment", *Int. J. Cancer*, vol. 48:895899, (1991).

Furchgott et al., "The Obligatory Role Of Endothelial Cells In The Relaxation of Arterial Smooth Muscle By Acetylcholine", *Nature*, 288:373–376, (1980).

Schumpe et al., "Solubility of Oxygen In Electrolyte Solutions", *Biotechnology And Bioengineering*, vol. 20:145–150, (1978).

Burnett et al., "Nitric Oxide: A Physiologic Mediator Of Penile Erection", *Science*, vol. 257:401–403, (1992).

Shaw et al., "Recovery of Cells in Vitro From The Effects Of Hypoxia And Hyperoxia", *J. Cell. Physiol.*, vol. 73:119–124, (1969).

Spier et al., "An Examination Of The Data And Concepts Germane To The Oxygenation of Cultured Animal Cells", *Develop. Biol. Standards*, vol 55:81–92, (1984).

Stern et al., "Direct Observation of The Oxygen Paradox In Single Rat Ventricular Myocytes", *Circ. Res.*, vol. 56:899–903, (1985).

METHOD AND APPARATUS FOR PERFORMING OPERATIONS

The invention relates to a method for performing a function or an operation involving a material, in particular a non-gaseous material such as a biological material subjected to a scientific investigation, under a gaseous atmosphere in a closed chamber. The invention also provides a new principle for avoiding pollution by gaseous materials and airborne particles from a substantially closed space, such as a workbench or workstation, to the environment, or from the environment to the closed space.

The invention also relates to a housing, in particular for housing biological material in a gaseous atmosphere while an operation involving the material is performed, such as a workbench, an incubator, or a workstation comprising one or several incubators in combination with a work space or workbench.

In addition the invention relates to a garment, in particular a glove comprising a flexible double layered structure defining a space containing a gaseous atmosphere.

The invention is applicable in various fields where transfer or gaseous materials from a closed space to the environment or from the environment to a closed space is undesired.

BACKGROUND OF THE INVENTION

Scientific groups have shown that various gas pressures may have an effect especially on reaction of immune cells towards tumour cells (J. Immunol. 138:550;1987), and more generally on the biological reaction forms of various cells (Science 257:401;1992, Nature 288:373;1980).

Working with biological systems in which a determined gas partial pressure is to be maintained is extremely difficult if proper provision is to be made for the health of the system operator.

It has been shown that even a moderate modification of the partial oxygen pressure of cells will influence the general functions of the cells and the physiological conditions in which the cells are examined. This entails that presently, the in vitro conditions under which various physiological cells functions are investigated are not optimal for imitation of in vivo physiological conditions. Furthermore, in connection with e.g. incubation for production of cells or cell products, the conditions which are optimal for the production may differ significantly from the environmental conditions e.g. with respect to oxygen partial pressure. In addition, in the presently used work benches, alternating and variable oxygen partial pressures will prevail which means that experiments performed therein will be subject to uncontrollable experimental variations with respect to a major parameter. It would therefore be extremely valuable to have incubator walls, workbenches, and other equipment for biological material that make it possible to work with completely fixed gas parameters during the entire experiments. It would also be highly valuable to have biological stations in which incubators and workbenches are coupled such that all handling of biological material takes place at constant gas partial pressure without any safety hazards such as contamination to or from the surrounding environment.

In e.g. hospitals where patients are subjected to general anaesthesia, the environment of the patient is often contaminated by the volatile anaesthetics, resulting in a considerable risk of endangering the health of the hospital personnel working in the field of surgery. Therefore, avoiding escape of gases from the anaesthetic equipment to the environment would be desirable.

Furthermore, within the welding and electronics industry (e.g. microchips, and lithium batteries) it is often desired to operate with a determined gas partial pressure when working with specific materials such as, e.g., silver, silicium, aluminum, lithium and copper. The present invention makes it possible to obtain a protection, not only of the operator himself and against pollution of noxious gases to the environment, but also of the processed material against active oxygenating gases.

It appears from the explanation given above that it is desirable to obtain specific conditions within a closed chamber with respect to the total gas pressure of a gas, or with respect to the partial pressure of a gas species, or with respect to the ratio of two or more gas species present in a mixture in a flow bench, fume box, sterile box or other working chambers.

In experimental work with biological material such as cell cultures, bacteria, spores, virus, biologic or synthetic DNA or RNA, etc. it is important that the environmental, physical conditions can be controlled in order to secure the most favourable conditions for the experimental work. Accordingly, in some experimental situations, it is desirable to keep the conditions on extreme levels compared to the natural environment of the biological material or compared to the normal environment wherein the experiment is performed. In other situations, it is of importance to keep the experimental conditions within very narrow limits. The control of known variable parameters when working with biological material is a desirable and important task since the consequence of even small differences in each experimental trial might lead to an increased variation within the results and more data will therefore be needed to obtain the same statistical evidence from the results.

The biological function of all cells are based on the ability of the cells to keep different compartments separated and thereby obtaining different physical environments for the cellular processes. By such separation, the living cell makes it possible to maintain concentrations of constituents which differ from the concentration in the surroundings of the particular compartment.

When biological material, e.g. for experimental use, is removed from a multicellular organism, there are several factors which need to be artificially controlled. Such factors which are normally artificially controlled in experimental use include humidity, acidity, temperature, nutrients, gas components, and gas pressure, total as well as partial gas pressures. Traditionally, however; in work with cells such as mammalian cells, the gas phase has been allowed to reflect ambient air, except when carbon dioxide has been added to cultures or living cells to affect the acidity of the system. However, it is well known that the partial gas pressure or the molar concentration of gasses in the environment of the individual cell inside a living organism is different from and has an other composition than that of ambient air.

When working with biological material in the laboratory, various attempts have been made to achieve desired physical conditions with respect to partial gas pressure of a gas species and total gas pressure. Positive and negative total gas pressure systems are two distinctly different principles used for known laboratory work spaces which will be described in greater detail in the following:

One strategy for establishing a partial pressure of a gas species in a working space is by flushing the working space with the desired gas composition. In connection with this, either a higher (positive) total gas pressure or a lower (negative) total pressure is established in the working space compared to the total pressure of the surroundings of the working space. The separation between the working space and the surrounding space is established by means of a wall, the main part of which may be made of a material which is substantially impermeable to gas, but it is almost impossible to seal the working space completely to gases present in the surrounding space because it is normally necessary to manipulate the material in the working space, thus necessitating the use of transparent polymeric materials through which many gasses are able to diffuse. Also, various types of lead-ins through the wall such as glove lead-ins and means for gas supply, gas exchange, etc, are needed for a sufficient handling of the material within the work space, but such lead-ins tend to allow at least a certain mixing of gas present within the working space and gas present in the environment.

The most effective way to obtain a tight working space is by use of a closed space having walls consisting of stainless steel wherein all connections of the steel are welded, whereby only a minimal gas transport through the walls is possible. However, for all practical uses, such a construction will not fulfil the normal requirements for manipulating the material in the chamber at a reasonable level. Lead-ins will still be required and cannot be completely gas-tight, and a solid stainless steel wall cannot possibly comprise a transparent wall allowing inspection of the working space.

In U.S. Pat. No. 4,026,286 an isolator is disclosed wherein an isolated environment at a higher pressure than the ambient environment has a transfer port which comprises a flexible sleeve leading from an opening in the isolator. The purpose of the sleeve is to produce a substantially planar non-turbulent flow in the air leaving the isolator through the opening whereby unsterilized air flowing back to the isolator is avoided.

Thus, when working in practice with a positive gas pressure in the working space, there is a considerable risk of contamination of the surrounding environment and the persons working in the surroundings by the gases or by airborne particles deriving from with the material handled in the working space.

By using a negative pressure in the working space, the risk of contamination of the surrounding environment is avoided; however, there is an increased risk of contamination from the environment to the material to be handled.

In GB-A-1201748 a transfer lock is disclosed comprising a sealing-tight chamber which is closed by two removable doors, one door connecting the lock to a sealing-tight vessel and the other door connecting the lock to the space outside the vessel. The transfer lock comprises a scavenging air ventilation circuit whose output directly supplies the vessel.

In U.S. Pat. No. 5,022,794 a tight insulator is disclosed from which it is possible to rapidly discharge objects under an overpressure by placing the object in a discharge tube and opening a door sealing the discharge tube, whereby an air flow is directed through the tube towards the outside of the insulator as a result of the overpressure within the insulator, thus counteracting entry of air from the outside into the incubator; a further measure against such entry of air is suction from an exhaust pipe connected to the discharge tube and creating a suction action in the immediate vicinity of the door. A procedure parallel thereto for inserting objects rapidly into an insulator under vacuum by use of an introduction tube connected to a ventilation circuit is also suggested in the patent.

When working with a negative pressure chamber as described above the present inventors have experienced that in situations wherein a low oxygen partial pressure is desired it is only possible to obtain a constant oxygen partial pressure down to 3 Kpa since gases from the surroundings will diffuse towards the working space. If the operation cost are to be kept at a reasonable level, it is only possible to maintain a constant oxygen partial pressure down to 6–7 Kpa. Furthermore, although incubators where oxygen tension can be set and kept an values down to about 3 kPa exist on the market, the necessary opening of the incubators for inserting, removal or manipulation of cultures immediately results in the oxygen pressure of ambient air. It is known that sudden changes in oxygen tension especially the reoxygenation process may be harmful to the cells and have influence on the biological processes of the cells.

Another possibility for controlling the oxygen tension in cultures is provided by bioreactors or fermentors where several factors such as oxygen tension, pH and temperature are monitored and controlled by computerized control systems. The replacement of medium is here possible without opening the container. However, it is impossible to perform more elaborate manipulations of the cells without breaking the insulation and thus the constant environmental conditions (gas molar concentrations), and thereby expose the cells to the high oxygen tension of ambient air.

DESCRIPTION OF THE INVENTION

Figure 1:
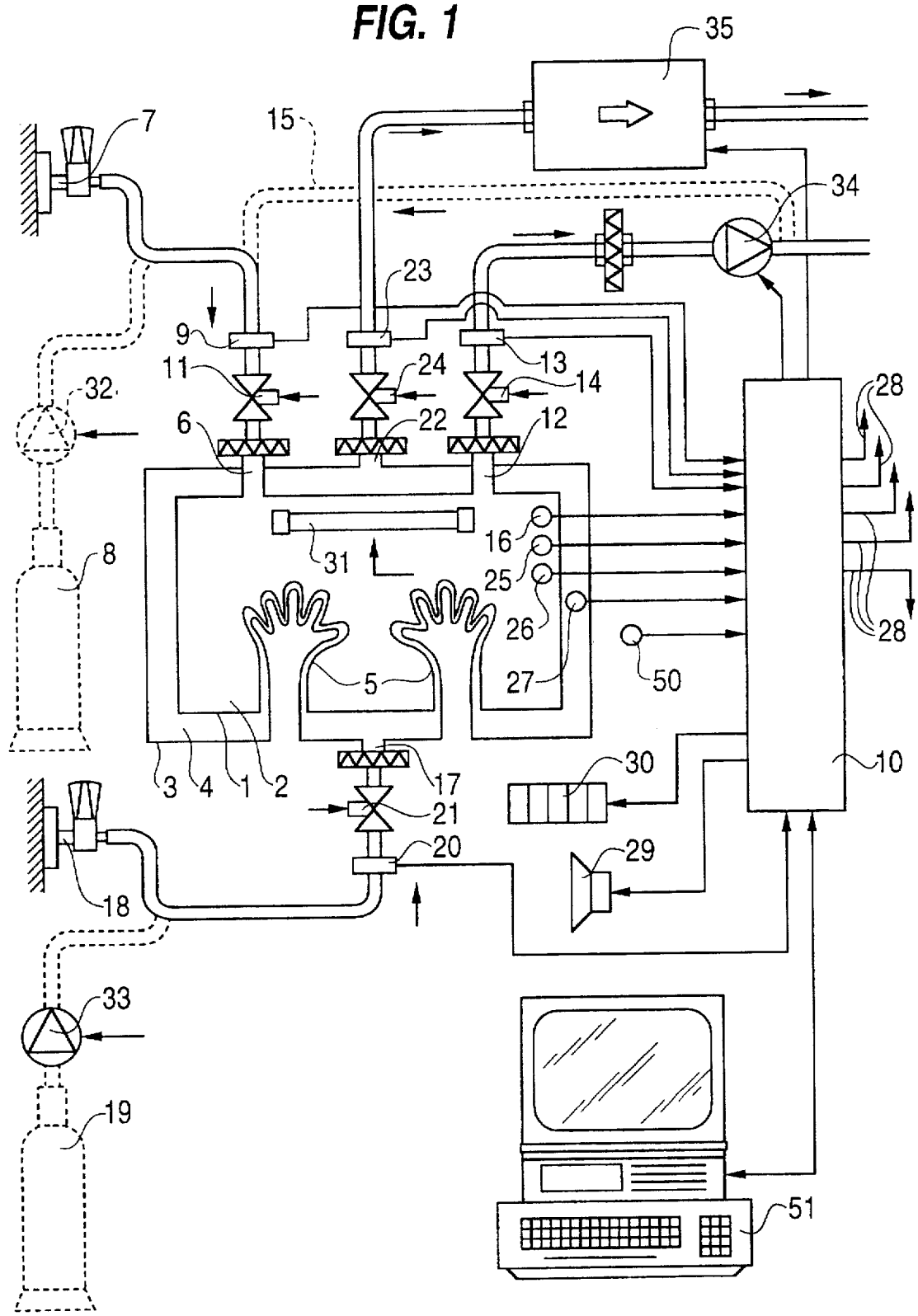
FIG. 1 is a schematic flow diagram in accordance with a method of the present invention.

According to one principle, the present invention relates to a closed space such as a housing which is separated from the environment of the closed space by an intervening space which substantially encloses the closed space and which permits establishing and controlling or maintaining different gas conditions between the closed space and the environment both with respect to the gas composition and gas pressure and with respect to exchange of gas between the interior of the closed space and the environment.

In the present specification and claims, the term "substantially encloses" or "substantially enclosing" indicates that the intervening space encloses the closed space substantially completely, and preferably completely, with the possible exception of areas where the wall of the closed space is of such a character that it in practice is tight for all relevant gases under the relevant conditions of use and where, accordingly, the intervening space would not contribute to controlling or maintaining a desired gaseous atmosphere in the closed space in accordance with the principles disclosed herein. In practice, such gas-tight wall parts would be wall parts made in a construction and of a material which is practically impermeable to gases present in the closed chamber or in the surrounding atmosphere. From this it appears than leads, connections or welded part should preferably not be present in such wall parts. It will thus be understood that most leads and connections to and from the inner chamber will necessarily pass through the intervening space enclosing the closed space.

The intervening space makes it possible to maintain a given constant gas partial pressure of a gas species in a substantially closed space such as a housing, chamber or container which the intervening space encloses. By forming a barrier between two spaces by means of an intervening space, undesired gases, particles, matters or microorganisms can be prevented from passing between the spaces which are separated by the intervening space. As explained in greater detail below, the intervening space will normally contain a lower molar concentration (corresponding to a lower partial pressure) of a selected gas species than the molar concentration of the gas species which is desired in the closed space which the intervening space surrounds, and furthermore, the intervening space will normally have a total molar concentration of gas (one or several gas species) which is lower than in both adjacent spaces. Compared to the situation without the intervening space, the equilibration of one or several selected gas species between the closed space and the surrounding atmosphere (normally air) is prevented or counteracted by having a lower molar concentration of the selected gas species in the intervening space than in any of the spaces which the intervening space separates.

The intervening space is constituted by a double wall penetrated by leads between the environment and the inner working space. The intervening space itself may also be equipped with lead-ins and lead-outs for the supply and removal of gas and with means for measuring the content of gases and means for adjusting gas pressures in the intervening space. The inner work space which is substantially enclosed by the intervening space may also be equipped with means for measuring total gas pressure and/or the partial pressure or concentration of a gas species content and means for adjusting the total gas pressure or the partical pressure or concentration of a gas species, e.g. in response to the measurements by the measuring means, whereby a desired total gas pressure or a desired partial pressure of a selected gas species can be obtained and maintained in the working space.

Thus, according to the invention, a desired or predetermined partial pressure of a gas species can be maintained in the inner closed space of two spaces which are adjacent to each other except for the intervening space and which have different partial pressures of one or several selected gas species and/or different total gas pressures, and the transfer of gas components, particles or noxious matters, e.g. health damaging matters or other contamination can be avoided between these adjacent spaces. (in the present specification and claims, the term "contamination" is to be understood as designating any pollution, particle, gas or organism which is not aimed at or desired to be present in the environment in which it appears (which it contaminates)).

This combined goal is achieved by means of two principles:

1) By creating a smaller total gas pressure in the double wall than in both the work space and the surrounding space.

2) By creating a smaller gas partial pressure for a gas species in the double wall than the partial pressure of the gas species desired in the work space.

(In the present specification and claims, the term "work space" or "working space" designates the space/room in which an operation (that is, work, experiment and/or incubation, cf. the discussion of the term "operation" below) is carried out, this being, in the cases relevant to the invention, at a particular given or predetermined gas partial pressure or gas composition which is different from the surrounding space or air atmosphere.)

Re 1) Establishment of a total gas pressure within the intervening space of the double wall which is lower than both the total gas pressure in the work space and the total gas pressure in the surrounding space creates a flow by means of which unwanted particle contamination of both the work space and the surrounding space is avoided, because the particles will be led between the inner part of the double wall of the intervening space towards filters or other suitable means and thereby evacuated from the space; in other words, there will be no direct flow between the two spaces surrounding the intervening space/housing.

Re. 2) The partial pressure of a selected gas species within the intervening space of the double wall should preferably—and in most embodiments of the invention: must compulsorily—be kept lower than the gas partial pressure of the gas species which is desired in the work space. This is of special importance when the selected gas species is one which is present in the ambient atmosphere at a partial pressure exceeding the desired partial pressure in the working space. By flushing the inner space of the double wall with a gas meeting the above-mentioned specifications, or otherwise securing a lower partial pressure of the selected gas species in the inner space of the double wall, and by supplying the working space with the desired gas composition, a constant partial pressure of the selected gas can be achieved in the working space.

Thus, there is no undesired or uncontrollable diffusion or flow between the work space or housing and the surrounding space but only from the work space or housing to the double wall, and from the surrounding space to the inner space of the double wall, respectively.

One use of the invention is preventing undesired gas combinations, such as explosive compositions, to occur within a space by separating the space from an outer space by an intervening space and as mentioned above preventing undesired mixing of gases or controlling the ratios of the gas species present in a gas mixture within the working place or in the double wall according to the above principle.

It is within the scope of this principle of the invention that for cleaning purposes, during periods where the system in question is not in its normal operation, the reverse function is possible, that is, the intervening space (the interior of the double wall) is under a positive total gas pressure compared to the work space and to the ambient atmosphere.

In the present specification and claims, the term "gas pressure" refers to total gas pressure as well as partial gas pressure of a gas species if not otherwise specified. A partial gas pressure of a gas species is the pressure of the gas species in a gas mixture which the gas species would create if it were the sole gas species present in the same volume as the gas mixture. The total gas pressure of a gas (gas mixture) is the sum of the partial gas pressures of the gas species present in the gas (the gas mixture).

The term "one or several gases" is intended to designate one or several gas streams or rather one or more gases from one or more gas supplies, each of which may be provide either a mixture of gas species or a substantially pure gas species; in other words, in the present specification and claims, the term "gas" is distinct from "gas species".

The experience of the inventors from testing known technology in the field of laboratory equipment for working with low partial pressures of gas species which are also present in the atmosphere, shows that no space can be established in such a way that the space is completely gas-tight. Thus, there will always be a diffusion gradient (Cf. Fick's law) across the walls of the space, especially where the walls are made from by materials not completely impermeable to gases and where the inlets and outlets to or from the space are sealed to the walls.

The transport of gases between two separated spaces delimited from each other by means of a wall or barrier can be expressed by diffusion of gas through the material defining the barrier between the spaces by Fick's law:

$$D_1 \times \delta C_1 / x = \text{constant} \times C_1$$

In which $D_1$ is the diffusion coefficient for a gas species, e.g., oxygen, in the material which the gas passes through, $\delta C_1$ is the difference in concentration between the two sides of the wall or barrier, $\delta x$ is the thickness of the wall or barrier, and $C_1$ is the concentration of the gas in one of the spaces.

The diffusion coefficient ($D_1$) depends on the material forming the wall or barrier and the gas species crossing the wall or barrier. The concentration difference of the gas species is measured in moles per unit volume on each side of the wall or barrier of a given gas species, $\delta C_1$. From this, it is clear that the diffusion increases with increasing difference in gas concentration of the selected gas species on each side of the wall or barrier and with an increasing diffusion coefficient.

By establishing, in accordance with the principle of the invention, a wall consisting of a combination of a solid phase, a gaseous phase and a second solid phase, the diffusion constant for the diffusion of a gas species through such a wall can now be subjected to an active adjustment resulting in a reduced diffusion constant when maintaining a low concentration of the gas species within the gaseous phase of the wall. Keeping the partial pressure of the gas species lower than the partial pressures of the gas species in the spaces which the wall separates contributes to a decreased diffusion of the gas species across the wall.

In other words, the present invention could also be said to relate to a method wherein the diffusion of gasses between a working space and the surroundings such as the ambient atmosphere is decreased by reducing the diffusion constant ($D_1$) of the gas species through the barrier in order to reduce a gas exchange between a work space and the surroundings of the work space. This diffusion constant is decreased by transforming the barrier to a double wall defining an intervening space from which the gas is removed and thereby preventing the diffusion through the outer part of the wall.

From another point of view, it will also be understood that the manipulation of the diffusion in accordance with the principles of the invention compensates for or dominates over the differences or variations in diffusion of different gases through different materials of the housing which would otherwise complicate the maintenance of specific molar ratios of gas species or ranges of gas pressures within a work space. Maintaining a predetermined value is made easier since the intervening space in some situations has a "buffer" capacity.

A suitable way of ensuring a partial pressure of a selected gas species is by supplying the intervening space with a constant flow of a gas having a partial pressure of the gas species lower than the partial pressure of the gas species that is desired to be established in the work space, especially when the selected gas species is a gas species which is present in the ambient atmosphere (normally air) at a higher partial pressure.

The constantly lower partial pressure of a gas species in the intervening space may be established and/or optimized by means of a suitable gas trap in the wall, e.g. a reagent with which the gas species in question can react and/or a catalyst which will catalyze reaction of the gas species, which gas trap can be placed inside the intervening space or be incorporated into the wall of the double wall. This gas trap principle can also contribute to the removal of undesired gaseous material before emitting gas from the invervening space (or from other parts of the system in question) into the atmosphere and can especially contribute to the decomposition of noxious gasses. The catalyst may be selected from metals belonging to the I–VIII groups, and oxides, nitrides, and halides of the metals as well as lanthanides and actinides. Examples of such metals are vanadium, titanium copper, molydenum, wolfram, silicium; osmium, nickel, palladium, platinum and iron.

In situations where gas is removed from the intervening space (or from other parts of the system in question), the gas is normally passed through a filtering system before being emitted into the atmosphere. Examples of suitable filter systems include systems based on sieving such as bag filters which are normally prepared from, e.g., Gorerex®, Teflon®, woven glass-fiber, textile cloth, etc. A preferred filter is a filter retaining particles to a degree of at least 95%, preferably at least 97% and more preferably at least 98 or 99% or more. Thus, HEPA filters (cellulose) are capable of retaining particles to a degree of 99.997%. Other suitable filtering systems include systems based on precipitation, sedimentation or electrostatic deposition.

In one aspect, the invention can be expressed as a method for performing, at a particular partial pressure of a selected gas species in a gaseous atmosphere or at a particular total gas pressure of a gaseous atmosphere, an operation involving a material, e.g. a non-gaseous material, comprising performing the operation in a housing comprising i) first chamber walls defining a first chamber containing a gaseous atmosphere and ii) second chamber walls defining a second chamber substantially enclosing the first chamber, the second chamber containing a gaseous atmosphere between said first and second chamber walls, the operation being performed in the said first chamber while a) the partial pressure of the selected gas species or the total gas pressure in the atmosphere of the second chamber is lower than the partial pressure of the selected gas species or the total gas pressure, respectively, in the gaseous atmosphere in the first chamber, and b) the partial gas pressure of the selected gas species or the total gas pressure in the atmosphere of the second chamber is lower than the partial pressure of the selected species or the total gas pressure, respectively, of the gaseous atmosphere in an adjacent outer third chamber or space.

The non-gaseous material on which the operation is performed may be any non-gaseous material, such as a liquid material or a solid material, a suspension of solid material in liquid, etc.; important examples of materials are biological materials or synthetic materials analogous to biological materials, such as proteins produced from recombinant or synthetic DNA. Particularly important biological materials are cells or cell parts or cell components and especially biological material having metabolic activity, such as cell cultures, or bacteria or spores or virus, including as bacteriophages, and components thereof. Correspondingly, the operation may be any operation which it is relevant to perform on the material in question and where the composition or pressure of the gaseous atmosphere contained in the chamber may have an influence on the operation or its result. Typical operations on biological material which may advantageously be performed according to the invention are operations wherein the desired gaseous atmosphere differs considerably from the ambient atmosphere, either with respect to its composition or with respect to the partial pressure of one or more of the gaseous species of the atmosphere, and/or operations where interferences due to airborne material or gas species from the outer atmosphere are undesired, or where pollution of the outer atmosphere by an airborne component in the first chamber, such as pathogenic material, must be avoided.

In the present context, the term "operation" is to be understood in a broad sense and thus includes any inneraction with the material in question, whether this is a physical interaction or a chemical interaction, including a biochemical interaction or a biological interaction, as well as culturing cells in a culturing medium or just keeping a material under the gas pressure conditions in question. Thus, any kind of operation which takes place in the above-mentioned incubators, flow benches and workbenches is included. However, a most important feature of the invention is that it permits physical interaction, including tactile interaction, such as manipulation, with the material. Manipulation can be directly manual by a person via an interface of a glove-like type, such as illustrated in the drawings, or another interface which may or may not have a particular shape or conformation which allows manipulation with the interface interposed between the person and the material to be manipulated. Interfaces which have special shapes or conformations can be in the shape of more or less complete garments or garment parts, normally including glove parts. The physical, in particular tactile, interaction can also be interaction via a robot or other automated and/or controllable manipulation equipment.

The term "one or several gases" is intended to mean one or several gas streams or rather one or more gases from one or more gas supplies, each of which may provide either a mixture of gas species or a substantially pure gas species; in other words, in the present specification and claims, the term "gas" is distinct from "gas species".

In many embodiments, the gaseous atmosphere of the outer third chamber or space is the ambient atmosphere, so that the outer wall of the second chamber is the delimitation of the system in question against the ambient atmosphere, e.g. in a laboratory or a factory.

While many embodiments may be contemplated in which it is critical that the operation performed in the first chamber is performed at a particular total gas pressure which may be at atmospheric level or at a higher or lower level, the value of the present invention will often be associated especially with the fact that the invention makes it possible and easy to maintain a particular partial pressure of a selected gas species in the atmosphere of the first chamber, in other words in the atmosphere under which the operation on the material in question is performed. While the most prominent example of this may be the situations where a biological material is to be subjected to an operation at a lower partial pressure of oxygen than in the ambient atmosphere, examples of other gas species the partial pressure of which it is of importance to control with a high precision are nitrogen, carbon dioxide. It will be understood that the particular partial pressure of the selected gas will be independent of the total gas pressure in the first chamber. Thus, it may be desired to have a low oxygen partical pressure and at the same time a total gas pressure corresponding to atmospheric pressure (in which case one or more gases different from oxygen will contribute with a higher partical pressure, in other words be present in a higher molar concentration, than in atmospheric air), or it may be desired to have both a low partial pressure of oxygen or another selected gas and a low total gas pressure, or there may be cases where it is desired to have a low partial pressure of oxygen or another selected gas and at the same time a total gas pressure which is higher than the atmospheric pressure.

The particular partial pressure of a selected gas species may be obtained and maintained in a number of different ways, such as will appear from the comments above and the following discussion.

Thus, one or several gases may be supplied to the first chamber, and the composition and/or flow of the gas or gases supplied may be adapted to provide the particular partial pressure. It will be understood that unless the operation performed in the first chamber or another process performed in the chamber consumes one or several gases, a prerequisite for obtaining and maintaining a particular partial pressure of a selected gas in the first chamber solely by supply of a gas or gases thereto is that there is a diffusion or leakage of gas out of the first chamber, either a diffusion leakage through a gas-permeable wall part, or an active "leakage" in the form of active removal of gas. The various ways in which gas can be removed from the first chamber will be discussed in the following.

Another embodiment of the method is where gas is removed from the second chamber, the composition and/or flow of the gas removed being adapted to provide a particular partial pressure of a selected gas in the first chamber or to provide a total pressure in the second chamber lower than the total pressure in the first chamber and/or in an adjacent outer chamber or space. In this case, which is especially relevant where a very low partial pressure of a selected gas, such as oxygen, is to be maintained in the first chamber, gas diffusion from the first chamber to the second chamber will be the means employed to obtain the low partial pressure of a selected gas species in the first chamber.

An important embodiment of the method according to the invention is where one or several gases is/are supplied to the first chamber, and gas is removed from the second chamber, the composition and/or flow of the gas or gases supplied and the gas removed, respectively, being adapted to provide the particular partial pressure of the selected gas in the first chamber. It will be understood that in this embodiment, gas is actively removed from the second chamber, while at the same time (or earlier or later, but preferably substantially at the same time) one or several gases is/are supplied to the first chamber, the interaction between the two chambers in this case being by gas leakage or diffusion through a gas permeable wall part.

A higher number of regulation possibilities is had where one or several gases is/are supplied to the first and/or second chamber, and gas is removed from the first and/or second chamber, the composition and flow of the gas or gases supplied and the gas removed, respectively, being adapted to provide the particular partial pressure of the selected gas in the first chamber. In a case where there is supply and removal of gas from a chamber, the chamber is said to be "flushed" with gas of the composition determined by the composition of the gas stream or streams supplied to the chamber in question. In this connection, it should be noted that while direct removal of gas from the first chamber (in contrast to diffusion to the second chamber and removal from the second chamber) cannot be said to contribute to maintaining a higher total gas pressure or a higher partial pressure of a selected species in the first chamber compared to the second chamber, direct removal from the first chamber may nevertheless be a valuable measure in connection with, e.g.:

flushing of the first chamber with a particular gas mixture, where the gas introduced contains a low molar concentration or zero concentration of a gas species which is to be present in a very low concentration in the first chamber, or chemical and/or catalytical removal of a gas which is to be present in the first chamber in a very low concentration.

While removal of gas from the second chamber is perhaps the most important measure to obtain the relative negative pressure in the second chamber, it is also important to note that another measure to maintain a very low partial pressure of a gas species in the first chamber will be flushing of the second chamber with a gas which has a lower partial pressure of the gas species in question and preferably does not at all contain the gas species in question.

Determining the composition of the gas in the first or the second chamber or the partial pressure of the selected gas species in the first or the second chamber provides the possibility of a close control of the regulation of the process and the gas exchange between the first and the second chambers. Such measurement may be performed using, e.g., gas-selective electrodes for determining the partial pressure of a particular gas or other suitable measuring means known per se such as by spectrophotometric means or means using laser, normally combined with total gas pressure measuring means. The measuring means, both the total gas pressure measuring means and the selective gas partial pressure measuring means, are suitably connected to regulation equipment such as valves, pumps, etc. so as to obtain a feed-back regulation of the process which may be more or less automated. Using such measures, a desired steady state (maintenance of a desired partial pressure of a selected gas species in the first chamber) may be obtained within a rather short time and maintained with high accuracy, e.g. based on measurements/knowledge of the composition of the gas removed from or present in the second chamber. The removal of gas from the second chamber and optionally from the first chamber is normally performed by means of pumps or other means for evacuation of gas such as electrical evacuation means or suction devices.

Another possibility (which would have the advantage that it would avoid electrodes and other equipment that could drift or otherwise give rise to erroneous operation) would be to use conditions with respect to gas partial pressures, flushing, supply and removal of gases, etc. which had been established, based on a sufficient number of preliminary experiments or runs, to result in the desired gas partial pressure in the inner chamber, possibly combined with the use of some kind of marker function, for example a biological process known to proceed in a particular manner, e.g. giving rise to a visible or otherwise assessible indication, for example using as a marker in the interior chamber or housing a system comprising a liquid which would change colour depending on the oxygen partial pressure, such as and thus merely adapting the conditions so that they correspond to the thus empirically established values and also that the marker will confirm that the desired partial pressure conditions have been established and are kept.

Provided that the particular partial pressure of a selected gas is a partial pressure which is lower than in the ambient atmosphere, one way of maintaining such low partial pressure is to actively remove gas from the second chamber and adapt the composition and/or flow of the gas removed to provide the particular partial pressure of the selected gas in the first chamber. The removal of the gas is adapted so that diffusion between the first and the second chamber (and between the second chamber and the surrounding atmosphere) tends to secure the particular partial pressure of the selected gas in the first chamber. While removal of gas from the second chamber will normally mean suctioning off the gas mixture present in the second chamber by means of an evacuation means such as a suctioning means, e.g. a gas pump, embodiments can be envisaged where the removal of gas from the second chamber will selectively remove one gas species, e.g. where carbon dioxide from the first chamber is selectively removed from the atmosphere of the second chamber by chemical reaction with an alkaline substance.

Important embodiments of the method of the invention are operations performed on biological materials or analogues thereof at an oxygen pressure which is lower than ambient oxygen partial pressure to investigate, utilize or imitate processes which in nature take place at a low oxygen partial pressure. Prior to the present invention, maintaining a low partial pressure of oxygen of less than 6 kPa was, as mentioned above, difficult without very expensive equipment and measures because of the interference from the high oxygen partial pressure of the natural atmosphere.

Oxygen partial pressures which are often relevant in this context are oxygen partial pressures in the first chamber of at the most 18 kPa, such as at the most 14 kPa, e.g., at the most 10 kPa. Especially critical low oxygen partial pressures where the method of the invention is of particular importance are oxygen partial pressures in the first chamber is at the most 6 kPa, such as at the most 4 kPa, e.g., at the most 3 kPa or even at the most 2 kPa, such as at the most 1 kPa, e.g., at the most 0.5 kPa.

Especially in the case where a particularly low partial pressure of a gas, such as oxygen, which is present in the ambient atmosphere, is to be maintained, it may be of importance to remove gas from both the first chamber and the second chamber, the composition and/or flow of each of the gases removed being adapted to provide the particular partial pressure of the selected gas in the first chamber.

As indicated above, when the selected gas is a gas which is present in the ambient atmosphere at a partial pressure higher than the predetermined partial pressure of the selected gas species in the first chamber, one or several gases will normally be supplied which has/have a lower molar concentration of the selected gas species than the molar concentration corresponding to the predetermined partial pressure of the selected gas species in the first chamber, so that the supply of gas will tend to counteract the tendency for the higher partial pressure of the selected gas in the ambient atmosphere to increase the partial pressure of the selected gas in the first chamber. The most efficient variant of this strategy is, of course, where the gas or gases supplied is/are substantially free from the selected gas species, and where gas is removed which contains the selected gas species. If the total gas pressure in the first chamber is to be below ambient pressure, another method according to the present invention would be no remove gas from both the first chamber and the second chamber, the composition and/or flow of each of the gases removed being adapted to provide the particular partial pressure of the selected gas (e.g. oxygen) in the first chamber. As mentioned above one possibility of selectively removing a gas includes incorporation of a catalyst or a reagent in the chamber from which the gas should be removed.

When, on the other hand, the selected gas is a gas present in the ambient atmosphere at a partial pressure lower than the predetermined partial pressure of the selected gas species in the first chamber, there will be a tendency for the partial pressure to decrease because of leakage to the atmosphere, and this may be counteracted by supplying one or several gasses which has/have a higher molar concentration of the selected gas species than the molar concentration corresponding to the predetermined partial pressure of the selected gas species in the first chamber, in particular by supplying a gas which substantially consists of the selected gas species, and by removing gas which has a lower molar concentration of the selected gas than the molar concentration corresponding to the predetermined partial pressure of the selected gas species in the first chamber.

As indicated above, the first chamber walls may comprise a wall part of a material which permits gas leakage between the chambers, and indeed, it will be almost impossible to provide walls which do not permit any gas leakage at all. Typical examples of wall parts which will almost inevitably permit gas leakage are sealings around in- and outlets to each chamber and walls of transparent polymers. However, for many purposes, it will be preferred that the possibilities of leakage are regulated to a higher extent, e.g. by positively providing, as part of the wall in question, a gas-permeable membrane.

Such gas-permeable membrane may be a membrane of a material or a combination of materials which permits a controlled flow of gas therethrough, preferably a material or a combination of materials which has known properties with respect to gas permeation, which properties can be utilized for adaption to each particular use, e.g. by adjusting the thickness and/or the area of the membrane. In a particular embodiment, the membrane may of a material or a combination of materials which selectively or preferentially permit diffusion of particular gas species or a particular gas species. Examples of gas-permeable membranes suitable for the purpose of the present invention are silicone, zirconium which is especially permeable to hydrogen and which therefore would be of special interest for uses where one of the gashes used to keep e.g. an oxygen partial pressure low is hydrogen (in a molar concentration of at the most 10% to avoid risk of explosion), and polycarbonate which is highly permeable to $CO_2$ but not oxygen. In addition, plastic materials which facilitate the exchange of oxygen such as the material used for Permanox® plastic dishes (made by NUNC, Denmark) can provide part of the walls or constitute e.g. the first chamber walls.

As mentioned above, there will be a number of cases where the material in the first chamber comprises or develops an airborne toxic or noxious substance, and one of the important features of the present invention is that the toxic or noxious substance is substantially prevented from escaping into an adjacent outer third chamber or space by being trapped in the second chamber and removed from the second chamber. Likewise, gas and/or an airborne material from an adjacent outer third chamber or space is substantially prevented from percolating into the first chamber by being trapped in the second chamber and removed from the second chamber. In all of these cases, the removal of the material in question from the second chamber is preferably secured by actively removing gas from the second chamber, e.g. by means of a pump.

The present invention can also be said to relate to a housing which by separation of a space from the environment by an intervening space enables the prevention of mixing, exchange or flow of gas or vapour between the two separated spaces including impurities in the gas or vapour in form of suspensions of solids or liquid particles, bacteria, bacteriophages, spores, viruses, radioactive material, and any other airborne component or particle.

Thus, an embodiment of the invention relates to a housing, in particular for housing material, e.g. a non-gaseous material, while an operation involving the material is performed, the housing comprising first chamber walls defining a first chamber containing a gaseous atmosphere; and second chamber walls defining, between said first and second chamber walls, a second chamber substantially enclosing the first chamber and containing a second gaseous atmosphere; and means for maintaining a lower total gas pressure or a lower partial pressure of a selected gas species in the second chamber than in the first chamber and in an adjacent outer third chamber or space. The non-gaseous material may be a biological material or a material analogous thereto, including living cells and cell components.

The second chamber walls enclosing the first chamber walls and defining a second chamber therebetween are normally only necessary where the wall parts of the first chamber permit escape, diffusion, or leak of gases or airborne particles, in other words, where the wall is of such a character, material or thickness that such escape, diffusion or leak is a possibility, in particular in domains where continuity of the wall material is interrupted, such as where connections are present, or where leads pass through the wall.

Thus, for many purposes, a wall consisting of stainless steel and having a sufficient thickness will be regarded as a gastight wall part provided no interruption of the wall is present. Therefore, where such wall structures constitute the walls of the first chamber, an intervening space will not be needed to limit the risk of pollution or contamination of the inner first space or of an adjacent outer third chamber or space or to control gas partial pressures in the first chamber. Thus, for such wall parts which are to be considered gas-tight in relation to the intended purpose, there will either not be a double wall, or the first and second chamber walls are allowed to merge to a single wall. This means that for many purposes, the intervening space or second chamber will only be present around connections or leads, e.g. as discrete intervening spaces which may be separate from each other or may be interconnected, e.g. as a manifold-like structure; thus, it will be understood that the second chamber may be constituted by a multitude or intervenings spaces which may be interconnected or not.

Nevertheless, in many embodiments, the housing according to the invention normally comprises second chamber walls enclosing the first chamber walls completely except where inlets and outlets are extending through the chamber.

The housing according to the invention may be produced of any material known from the production of incubators and working benches such as stainless steel, butyl rubber, hardened glass, ceramic composite materials, special polymers, acrylic glass, carbon/Si ceramics, PVC, polycarbonate, polyethylene or other suitable materials. Materials not reacting with the gasses to be used and materials which can be cleaned and are resistant to disinfectants are preferred. Especially when operating with anaesthetic gases such as halothane, it should be noted that most metals are corroded and materials such as polyethylene are preferred. For cleaning compositions such as ethanol, acetone, chlor, ozone gas, Corsolin, Deconex, etc., may be used. Ozone gas may be provided within each of the chambers by flushing the chamber with oxygen and irradiate by ultraviolet radiation whereby the oxygen is converted to ozone gas.

An important embodiment of the housing according to the invention relates to a housing wherein the opposite parts of the walls are flexible allowing manipulation of or operating material or objects within the inner space from a position outside the second chamber walls. Depending on the degree of the flexibility and the area of the flexible parts of the walls, the possible manipulation varies from pressing buttons placed close to the flexible wall parts to a detailed manipulation by use of flexible wall parts protruding into the first chamber In a preferred embodiment, the flexible wall parts are glove shaped, and more preferred, the flexible glove shaped wall parts are prevented from collapsing against each other as a result of a lower total pressure within the second chamber than within the first chamber and the outer adjacent chamber or space, by separating the double layered gloves by means of a non-collapsible structure or framework forming a skeleton between the wall parts without interrupting or preventing flow of gas between the corresponding glove shaped wall parts. Examples of such a structure is grids, net-woven or knitted material, materials structured as communicating cells or lamellas or any other structure which is able to prevent collapse of the wall parts at the gas pressures present without preventing flow of gas between the glove shaped wall parts. Suitable materials are rubber, plastic, metals, and natural as well as synthetic fibers.

The glove shaped part of the first and second chamber walls may be made of a material which have gas selective properties.

For manipulating or inspecting the material within the housing in a sufficient manner, transparent wall parts are desirable. In an embodiment according to the invention, substantially opposite walls part are performed in a transparent material such as plexiglass, plastic materials, glass, etc.

It is normally desired to keep the housing as tight as possible except for possible intended gas-permeable membranes, therefore the leads to or from the walls of the housing as well as other means connected to the walls are preferably closely or sealingly connected to the relevant wall parts.

For inserting and removal of material and/or objects to the first chamber of the housing, air locks or ports constituted by releaseable mutually opposite wall parts may be present. The ports can be placed wherever suitable, including in transparent parts of the walls. In case of a workbench the ports are preferably placed in the front walls or in the side walls. When appropriate, the second space corresponding to the releaseable wall parts is broadened to allow temporary storing of the object or material during the insertion or removal procedure to prevent a direct communication between the first chamber and the adjacent third chamber or space.

Depending on the specific use of the housing, and accordingly on the desired flow or exchange of the gaseous atmosphere within the second chamber the size of the volume of the intervening second chamber will preferably vary and should be adapted to enable exchange or renewing of the gas species in question at a suitable velocity. Preferably, the depth of the space of the inner wall should be 1–1000 mm such as 2–350 mm e.g. 2–200. In many embodiments of normal workbenches or workstations according to the invention, the depth should be 2–20 mm. in addition, depending on the gas species used and the wall materials selected as well as of the shape and volume of the chamber, preferably, the second chamber constitutes a volume which substantially allows laminar flow of the gas contained therein.

In an embodiment of the housing according to the invention the ratio between the volume of the second chamber and the volume of the first chamber is in the range of 1:0.1–1:1,000,000 such as 1:0.1–1:1000 such as 1:1–1:300, e.g. 1:10–1:100.

An important property of the housing according to the invention is to avoid pollution or contamination of the environment. In most situations, it is undesirable that airborne pathogenic material escapes to or is emitted to the atmosphere, especially when the material is virus and/or gene manipulated biological material. In such situations the intervening space constitutes a specific advantage by trapping airborne material escaped from the inner chamber of the housing and thereby making it easy to expose the material to factors decreasing the risk of emitting such biological active material, e.g. by exposing the gaseous atmosphere in the second chamber to radiation or by flushing the chamber with a neutralizing agents.

As will be explained in greater detail in connection with the figures the housing may comprise means for supplying gas into the first and/or second chamber and/or means for removal of gas from the first and/or second chamber as well as control means and means for measuring and controlling the flow and compositon of the supply and removal of gas to and from the chambers. The means according to the housing for maintaining a difference in gas pressures may comprise means for controlling gas flow through gas inlets and/or outlets and may further comprise means for remotely controlling valves connected to the gas supply and gas removal. The valves are normally one way valves but more ways may be preferred when different gases are supplied to the valve. The means for removing a gas species may include means for chemical conversion of a gas, e.g., a catalyst, and such means may be provided in the first and/or the second chamber.

The housing may further comprise alarm means indicating or reacting to, inter alia, a gas composition measured in a range or at level exceeding a predetermined limit including reacting on the presence of a gas species, reacting on any other suitable parameter such as humidity, temperature, etc,.

A still further aspect of the invention relates to a garment, in particular a glove, comprising a double layered flexible material comprising a first layer of a first flexible material and a second layer of a second flexible material, the first and second layer defining a space therebetween containing a gaseous atmosphere and means for maintaining a lower total pressure or a lower partial pressure of a selected gas species within the inner space defined by the first and second layers compared to the outer space of the garment, and the inner space comprising a third flexible material being a material which prevents the first and second layer from collapsing against each other. The garment may also form part of the flexible wall parts of the housing according to the invention and the gloves may be in continuity with a suit or clothing.

In addition, the invention relates to a cover for collecting a gas, gases or an airborne material comprising a double layered flexible material comprising a first layer of a first flexible material and a second layer of a second flexible material, the first and second layer defining a space containing a gaseous atmosphere and means for maintaining a lower total pressure or a lower partial pressure of a selected gas species within the inner space defined by the first and second layers compared to the outer space of the cover, and the inner space comprising a third flexible material between the first and second material being a material which prevents the first and second layers from collapsing, the cover being able to enclose an object or part of an object from which gas or an airborne material should be collected or to which it should be protected from such gas, gases or airborne materials The interior material within the space defined by the first and second layer of the cover or garment may be any material which ensures that the cover is sufficiently flexible, that the necessary air flux or air exchange can take place within the cover, and than the two surfaces of the cover will not collapse against each other, and may be any material having properties suitable therefor, but it is anticipated that the most valuable material will be a fibrous material, either randomly arranged fibers or fibers arranged in a pattern or as a non-woven or woven or knitted structure, or a flexible material such as flexible gum, elastomer, rubber, plastic, etc., with an open cell structure.

Preferably the material of first and second layer of the garment or cover may be selected so that the layer directed against the object to be covered is a layer which allows flow of gas, gases or airborne material into the inner space of the garment or cover, and the layer directed against the environment is a layer which is substantially tight for the gas, gases or airborne material in question. If the use of the garment or cover is to protect the object from exposure of gas, gases or airborne material present in the environment, both layers are preferable constituted by a material which is substantially tight for the gas or material in question.

The cover is useful for local protection of connections such as leads through otherwise gas-tight walls but has many other applications as a result of the flexible material which allows shaping the cover to nearly any shape of the specific object or part of an object which is to be operated or protected from transfer of gas of gases or airborne material to or from the environment. For some objects the double layered structure of the cover will not be able to be shaped so that it completely corresponds with the shape of the object to be covered whereby the inner layer and the surface of the object are not densely connected. This may contribute to the formation of one or more additional intervening spaces between the surface or the object and the layer of the cover which is closest to the object. Those intervening spaces do not interfere with the principle according to invention so far that such spaces are not in connection with the environment. For the purpose of the principles of the present invention, such "passive" intervening spaces could be considered part of the wall between the first chamber and the second chamber, the wall then being constituted by the outer wall of the first clamber, the intervening space and the surface of the flexible cover facing the first chamber. In cases where no such "passive" intervening space is present, the wall between the first and the second chamber will merely consist of the wall of the first chamber and the surface of the flexible cover facing the first chamber.

In particular, the cover is anticipated to be very useful for situations where a gas is flushed through the cover, the composition of the gas being such that it has a lower partial pressure of a gas species which is to have a low partial pressure in the first chamber around which the cover is arranged. Another evident utility of the cover is where the flushing is with e.g. atmospheric air, but where the total gas pressure in the cover is lower than in the first chamber which the cover is to enclose, the cover thereby, e.g., being very useful for removing noxious gases or airborne undesired particles. Indeed, one embodiment of such a cover would be an exterior hose to be arranged around e.g. hoses or tubes, conduct materials which, if the materials or components thereof would escape to the atmosphere, would pollute the atmosphere or would constitute a health danger, for example tubes or hoses conducting anaesthetic gases.

The means for maintaining a lower total pressure or a lower partial pressure of a selected gas species in the space defined by the first and second layers of the garment or cover may be of the same kind and may function in the same way as described above for the housing according to the invention.

The cover is in fact constituted by first and second chamber walls as described for the housing. The flexibility of the layers of the cover allows the cover to define a space corresponding to the first chamber of the housing. Accordingly, the first layer corresponds with the first chamber walls and the second layer with the second chamber walls. The space defined between the first and second layers corresponds with the second chamber. In other words the cover corresponds with a housing according to the invention wherein the walls are flexible except that the layers/walls of the cover are connected to each other.

Thus, one embodiment could comprise the cover in fact in itself constituting both first and second chambers as described for the housing, because the flexibility of the layers of the cover would allow the cover to be arranged in a configuration where it defines a space corresponding to-the first chamber of the housing, where the first layer of the cover would correspond to the first chamber walls and the second, exterior, layer of the cover would correspond to the second chamber walls, this requiring, of course, that the cover when arranged in the configuration in question, is closed sealingly where the parts thereof meet, and, in accordance with the principle of the invention, should then be protected by another second chamber covering the sealing (because the sealing would constitute a single wall), however, for most practical purposes the flexible cover will constitute only the second chamber such as explained above, and the flexibility of the cover will be utilized to arrange the cover at the places of the walls of the first chamber where a second chamber is needed, the cover thus being a sort of a flexible "manifold".

In addition, a very interesting embodiment would be a garment or clothing where the first chamber would be constituted by a person, for example a diver as explained in more details below. It is evident that the first and the second materials of the cover could be identical, but as mentioned above, in many cases it would be advantageous to have the surface which is to face the first chamber more permeable to gas or to a specific gas than the exterior layer.

DETAILED DESCRIPTION OF THE DRAWINGS

FIG. 1 shows a diagram illustrating an embodiment of a workbench according to the invention wherein a housing comprising inner first chamber walls 1 encloses a first chamber 2 containing a gaseous atmosphere. The first chamber walls 1 are surrounded by second chamber walls 3 defining a second chamber 4 containing a gaseous atmosphere and substantially enclosing the first chamber 2. The first and second chamber walls define a continuous space not interrupted by means for manipulation of a material within the first chamber 2 as indicated by glove shaped parts of the first and second chamber walls 5. The glove shaped wall parts 5 consist of a double-layered glove pair wherein the outer layer is in continuous connection or is sealingly connected to the first chamber walls 1 and an inner layer of the gloves in continuous connection or sealingly connected to the second chamber walls 3.

The gaseous atmosphere in the first chamber 2 is maintained and/or regulated partly by gas supply means and partly by means for removing gas, the supply means comprises a gas inlet 6 extending through the second chamber walls 3 and through the second chamber 4 without communicating with the second chamber. Gas from a central gas supply 7 and/or gas connected to separate gas supply means such as a gas bottle 8 allows admission of gas to the first chamber and control of the composition of the gas supplied. The flow of the supplied gas is measured by gas flow measuring means 9 such as a gas-meter which is connected to a central control unit 10 adapted for receiving data from measuring means. The supply of gas or gas species to the first chamber is further controlled by the valve 11 e.g. a pneumatic valve or a solenoid valve which can be regulated by the control unit 10 (connection not shown but indicated by arrow). Means for removing gas from the first chamber 2 comprises a gas outlet 12 extending through the second chamber 4 without communicating with the chamber and through the second chamber walls 3. The flow of the gas removed is measured by the flow measuring means 13 such as a gas-meter which is connected to the control unit 10 allowing feed-back regulation (not shown) of the valve 14 for gas removal, e.g. a pneumatic valve or a solenoid valve. If desired, the removed gas can be recycled back to the first chamber as shown with dotted lines 15 of the diagram in addition, the gas from the second chamber may be recycled. The gas for recycling may be passed through a compressor 34 and/or a filter for removing undesired gas species or other components (not shown).

In the same way as for the gaseous atmosphere of the first chamber, the gaseous atmosphere of the second chamber 4 is maintained and/or regulated partly by gas supply means and partly by means for removing gas, the gas supply means comprises a gas inlet 17 extending through the second chamber walls 3 and communicating with the second chamber. Gas from a central gas supply 18 and/or gas connected to separate gas supply means such as a gas bottle 19 allows admission of gas to the second chamber and control of the composition of the gas supplied. The flow of the gas supplied to the second chamber 4 is measured by gas flow measuring means 20 such as a gas-meter which may be connected to a central control unit 10. The supply of gas to the second chamber is further controlled by the gas supply valve 21 e.g. a pneumatic valve or a solenoid valve which can be regulated by the control unit 10 (connection not shown but indicated with arrow). Means for removing gas from the second chamber 4 comprises a gas outlet 22 extending through the second chamber walls 3 and the flow of the gas removed is measured by the gas flow measuring means 23 such as a gas-meter which is connected to the control unit 10 allowing feed-back regulation (not shown but indicated by arrows) of the valve 24 for gas removal, e.g. a pneumatic valve or a solenoid valve. If desired, the composition of the gases removed may be measured whereby a close control of the gas exchange between the first and the second chamber can be calculated and a desired steady state (maintaining of a desired partial pressure of a selected gas) may be obtained within a short period by adapting the supply and removal of gases in relation to the gas exchange between the chambers. The removal of gas from the first and second chambers is normally performed by means of pumps or other suction devices (not shown) which may be connected to the control unit 10.

In addition, the control unit 10 is connected to gas measuring means such as gas electrodes or other electro-chemical measuring electrode devices for measuring the partial pressure for one or more gas species e.g. $O_2$ within the first chamber 2 as indicated by the means 16 and 25 and for measuring the total gas pressure as indicated by the means 26. In addition, similar means for measuring the total gas pressure of the gas and/or for measuring the partial pressure for one or more gas species in the second chamber is indicated by the means 27 and for the outer third chamber or space 50. The measuring means allows appropriate regulation and thereby controlling the partial pressures and/or the total pressure of a selected gas species or gas, respectively, present in the first chamber by adapting, based on the results of the measured values, the supply and/or removal of gas or gas species to or from the first and second chamber and a lower gas pressure or partial pressure of a selected gas in the second chamber than in the first chamber and than in an adjacent outer third chamber or space can be maintained. The regulation and maintenance of a lower partial or total pressure in the second chamber of the selected gas species or gas, respectively, are furthermore aided by transmitting and/or storing the data in a computer unit 51 connected to the central control unit allowing calculation and input of possible relevant data for working a controlled regulatory feed-back system such as by operations on the valves 11, 14, 21 and 24 for increasing or decreasing the gas flow through the valves. The feed-back regulation is indicated by arrows 28 from the control unit 10 and by arrows on the respective valves. The control unit 10 may also be connected to alarm means 29 which may be of audio and/or visional aids for indication of any undesired condition related to the workbench, e.g., increasing partial or total pressure of a gas species or gas in the second chamber. The alarm system is preferably connected to compensatory systems for the gas supply and removal to counteract an undesired condition detected by the alarm system. In addition, the control unit can be connected to a display 30, e.g. showing the gas pressure in the first chamber and/or second chamber. The control unit may also be connected to other means e.g. illumination systems 32 (ultraviolet radiation should be avoided when risk for explosive gas composition) and to detective means e.g. for detecting radioactivity. A further regulation of gas supply may be by operating gas compressors 32, 33, and 34 connected to the gas supply means 6 and 17. The control of the compressors may also be connected to the control unit 10 (as indicated by arrows). The measuring means described above as 16, 25, 24, and 27 may further comprise sensors detecting the presence of a specific gas species. In addition, the control unit may be such a unit which is able to receive and transform signals in any appropriate way such as physical, electrical and electro-chemical signals and receive and transmit radio signals, enabling maintenance of a desired gaseous atmosphere in the first and/or second chambers.

The gaseous atmosphere of the second chamber comprises, in addition to the gas supplied, gas and airborne material percolated into the second chamber from the adjacent chambers or spaces and is therefore preferably filtered for noxious material or gases by a filtering system 35 before the waste gas or airborne material is emitted to the environment.

Figure 2:
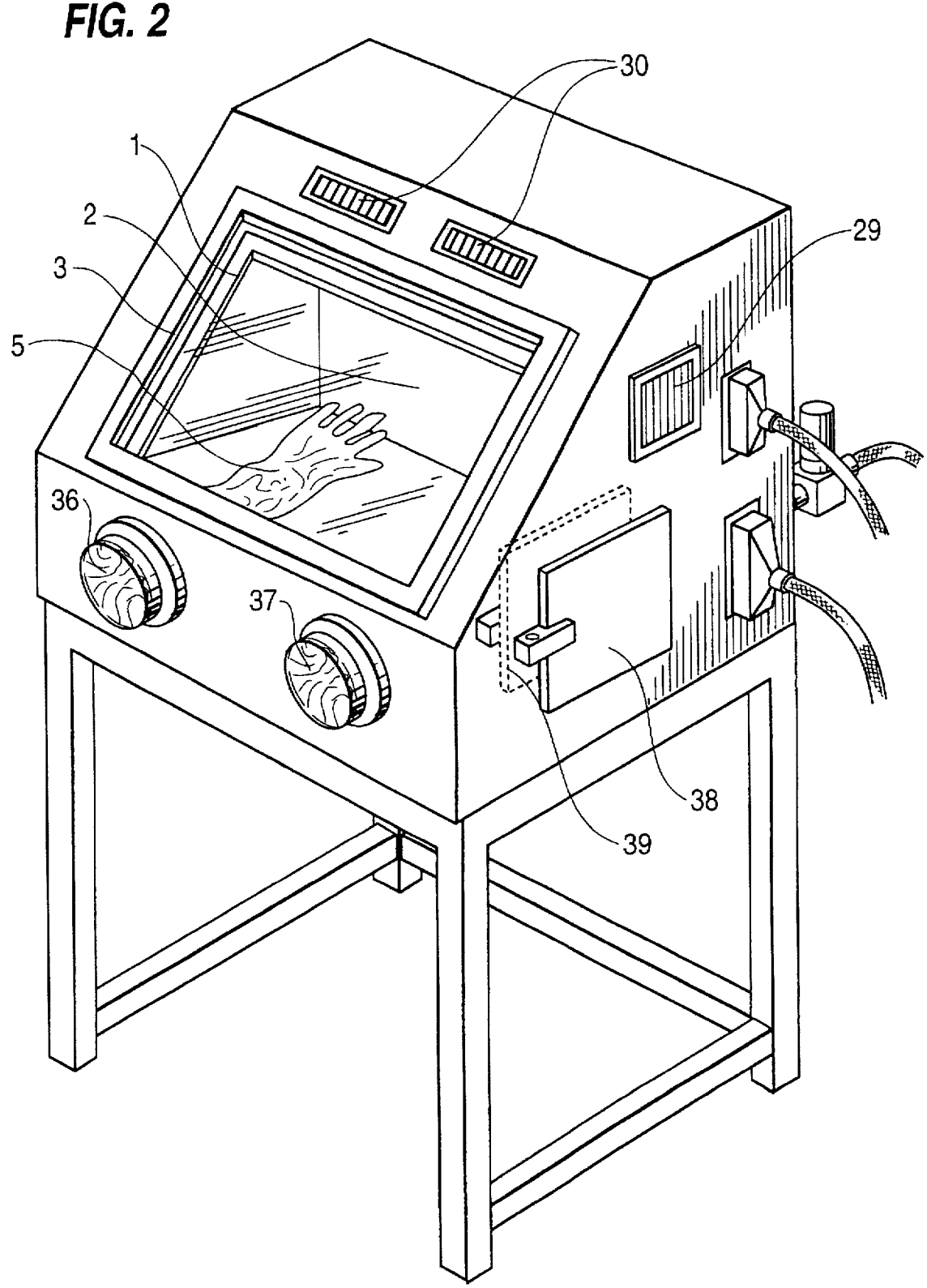
FIG. 2 is a perspective view of a housing in accordance with the present invention.

FIG. 2 shows an embodiment of a workbench according to the invention wherein a housing for operating objects and material in a first chamber 2 is shown. Opposite transparent parts of the inner chamber walls 1 and of the outer second chamber walls 3 as described in FIG. 1 allow view to the inner part of the first chamber 2 and to the flexible glove shaped part of the first chamber walls 5 protruding into the first chamber 2 as described in FIG. 1. Sealingly connected to and in continuation with the outer second chamber walls flexible glove shaped parts opposite to the glove shaped part of the first chamber walls protrude into the first chamber. The glove shaped part of the second chamber walls fits substantially into the corresponding glove shaped part of the first walls resulting in two-layered gloves protruding into the inner chamber whereby manipulation of objects or material in the workbench from a position outside the bench is made possible through the glove cuffs 36 and 37. Inserting objects into the workbench is performed through releaseable wall parts such as illustrated by 38 showing a releaseable wall part of the second walls which allows entrance into the second chamber defined between and separated by the inner first chamber walls and the outer second chamber walls of the bench as illustrated in FIG. 1. Objects may be inserted into the workbench in a two-step procedure by 1) placing the object in the second chamber through a releaseable wall part 38 whereafter the releaseable wall part 38 is closed and the insertion procedure continued from the inside of the chamber by use of the flexible glove shaped wall parts 5, and 2) opening a releaseable wall part of the inner walls 39 (indicated by dotted lines) opposite to the releaseable wall part 38. Between the two steps of the insertion operation, the second chamber can be flushed with a desired predetermined gas composition to avoid undesirable fluctuations of gas compositions and/or gas pressures within the first chamber. Accordingly, direct communication between the inner work space and the adjacent space or atmosphere is avoided. Of course, a procedure parallel hereto but in the opposite direction can be used for discharging objects from the first chamber. The separation of the releaseable walls parts 38 and 39 prevents a direct exchange of gas and airborne material between the first chamber and an adjacent outer third chamber or space through the releaseable parts. Display means, e.g. for showing pressure in the second chamber, is illustrated by 30 and means for auditive alarm is illustrated by 29.

Figure 3:
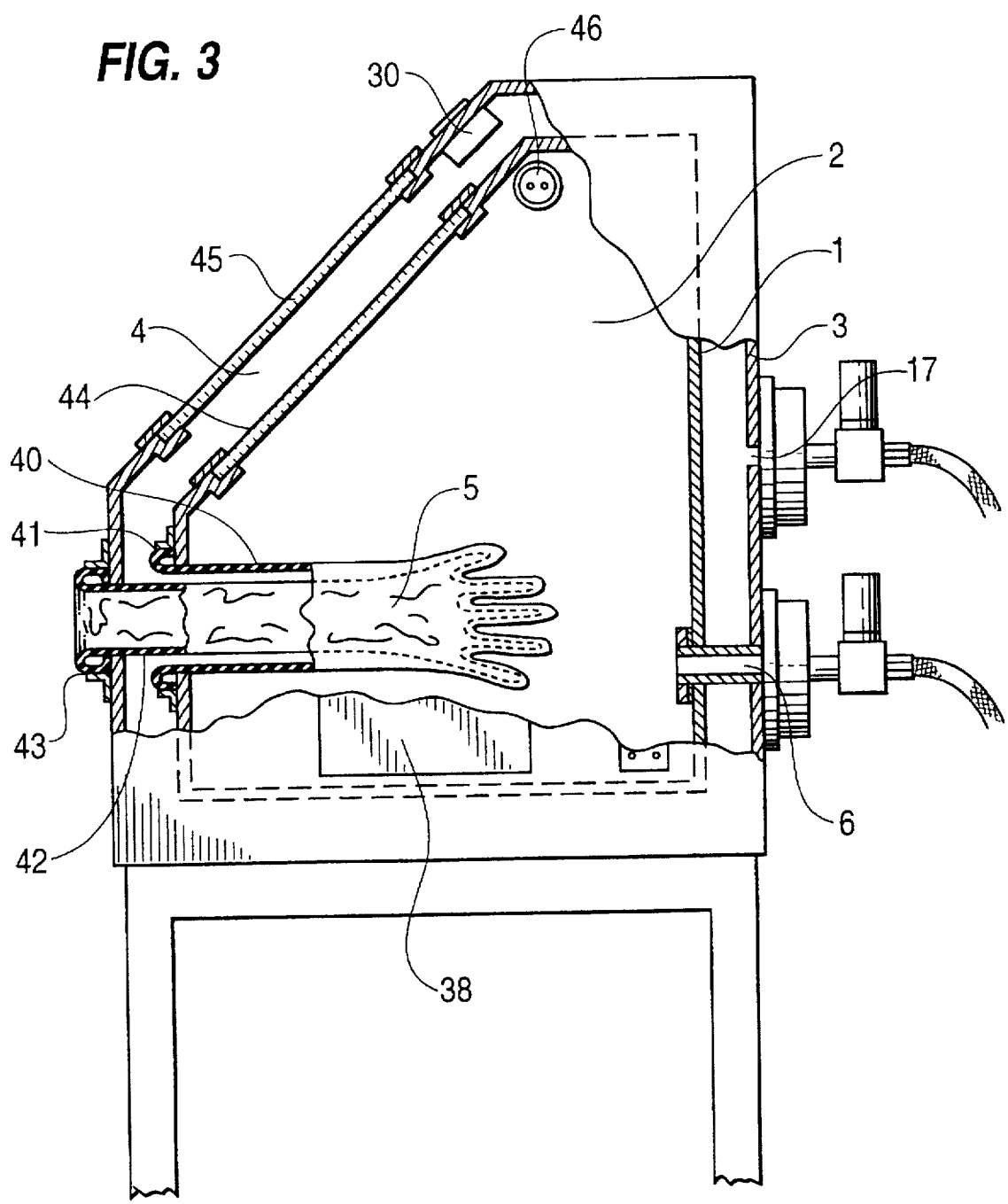
FIG. 3 is a side view in partial cutaway of a housing in accordance with the present invention.

FIG. 3 shows a cross section of an embodiment of a workbench as shown in FIG. 2 having a housing comprising inner first chamber walls 1 enclosing a first chamber 2. The first chamber walls 1 are surrounded by second chamber walls 3 defining a second chamber 4 therebetween. Parts of the first chamber walls 1 consist of flexible glove shaped wall parts 40 protruding into the first chamber 2, the glove shaped parts being continuously or sealingly connected to the non-protruding parts of the walls as illustrated by 41. Wall parts of the second chamber walls 4 opposite to the glove shaped parts of the first chamber walls 40 are similarly consisting of flexible glove shaped wall parts 42 also protruding into the second chamber and substantially fitting into the corresponding glove shaped part of the first chamber walls defining double-layered gloves 5. The glove shaped parts of the second chamber walls being continuously or sealingly connected to the non-protruding parts of the second chamber walls as illustrated by 43. The resulting double-layered flexible glove shaped wall parts 5 allow manipulation of means or objects within the first chamber from a position outside the second chamber walls without interrupting or limiting the continuation of the second chamber 4 which substantially encloses the first chamber. To prevent collapse of the flexible glove shaped parts e.g. as a result of a lover total pressure within the second chamber than within the first chamber and the outer adjacent chamber or space, the two opposite glove parts are separated by means of a non-collapsible structure or framework forming a skeleton between the wall parts without interrupting or preventing flow of gas between the wall parts. Examples of such a structure are grids, net-woven or knitted materials, fiber materials, communicating cells or lamellas or any other structure which is able to prevent collapse of the wall parts against each other without preventing flow of gas between the gloves shaped wall parts. Suitable materials for establishing said structure include rubber, metal, plastic, and natural as well as synthetic fibers.

For allowing a view into the first chamber of the workbench from a position outside, substantially opposite parts of the first and second chamber walls 44 and 45, respectively, are performed of a transparent material and are continuously or sealingly connected to the first and second chamber walls, 1 and 3, respectively. From the figure, it appears that the first and second chamber walls define one continuously coherent second chamber 4 which substantially encloses the first chamber except where inlets and/or outlets extend through the chamber. A gas inlet 6 to the first chamber is shown which is prevented from communicating with the second chamber. A gas inlet to the second chamber for supply of gas is shown by the means 17 and similar connections for removal of gas from the first and second chamber (not illustrated) are in accordance with the invention. In addition, an outer releaseable wall part 38 is shown, and means for a display 30 and plug means 46 are also shown.

EXAMPLES OF APPLICATION OF THE INVENTION

Laboratory use:

A workbench where constant oxygen can be maintained

Oxygen is basic to the metabolism of a wide range of living organisms. Among the multicellular animals, most have an internal oxygen tension lower than the 20.1 Kilo Pascal (kPa) of ambient air at sea level. Take man as an example. Only the living cells of the lungs alveoli receive their main oxygen supply at a partial pressure near that in ambient air. In most of the body tissue, the mean tension of the dissolved oxygen is about 6 kPa and in the fetus even a bit lower.

Oxygen is used throughout the body in energy generating chemical processes, which ultimately results in production of high-energy phosphate bonds and an excreting of carbon dioxide. Most of the oxygen is by far used for energy production in the cell organelles named mitochondria. The reaction constants for the key processes (e.g. oxidative phosphorylation) here suggest that energy production may go on unimpededly at oxygen tensions below 1/10th of physiological levels provided that there is a free access to oxygen. This might suggest that it is of little consequence at which oxygen concentration human cells are studies, the only demand is that $pO_2$ is above 1 kPa. However, recent work in Denmark, Norway and the United States has clearly displayed that other cellular characteristics important for normal functions and for disease process differ at different oxygen tensions between 20 kPa and almost anoxia, thus, in the tension range where the mitochondrial energy production is unaffected.

The most well controlled experiments include direct measurement of the oxygen partial pressure in the fluid medium where living cells removed from the organism are kept alive (tissue culture). Such studies (Ebbesen at al. in Vivo 5: 355–358, 1991 and Ebbesen at al. Experimental Gerontology, 28: 573–578, 1993) have demonstrated that cells kept at one half the physiological oxygen tension have a reduced interferon production, an enhanced production of virus, an enhanced expression of the major histocompatibility complex, enhanced proliferation and growth in vitro and reduced tendency for spontaneous in vitro transformation, which is conversion to a cell type reminding of natural cancer cells.

This means that cell characteristics central to infections, immune defence and cancer development are influenced by reduction on the oxygen tension from physiological levels to one half or one third of that.

Realistic biological laboratory work on many disease processes where the oxygen tensions may be locally lowered in the body therefore requires equipment controlling the oxygen tension.

When the oxygen tension is above the physiological level in mammalian tissue such as found in ambient air it is much the same situation as when going below physiological level. Tissue culture cells from internal organs grown with free access to ambient air as is the standard method worldwide have characteristics different from cells kept at physiological oxygen partial pressure. Also, here interferon production, virus growth and expression of the histocompatibility complex are altered. Furthermore, many cells grow more slowly at this unphysiological high oxygen tension.

It can therefore be stated that present practice in most research and production biological laboratories gives less than optimum imitation of the in vivo situation resulting in misleading data and sometimes in lowered production of biological material.

It is desired to keep the molar concentration of oxygen and carbondioxide in the working space constant.

If, e.g., the total pressure of the outer space $P_3$ (the environment) is 101 kPa and composed or the following partial pressures of: 20 kPa $O_2$, 0.003 kPa $CO_2$, 3 kPa $H_2O$, and 78 kPa $N_2$; and if the work space is filled with a gas composition of 2 kPa $O_2$, 5 kPa $CO_2$, 5 kPa $H_2O$, and 89 kPa $N_2$, i.e. a total pressure $P_1$ of 101 kPa, then the composition of the gas flushing the inner space of the double wall could be composed of 91 kPa $N_2$ and 5 kPa $O_2$ which gives a total pressure in the double wall $P_2$ of 96 kPa, which is less than the total pressure in the work space. By this difference in total pressure in the environment and the work space the diffusion of oxygen always takes place from the work space to the inner space of the double wall, and the oxygen concentration of the work space will therefore always be kept at 2. kPa $O_2$ when the work space is flushed with the composition and partial pressures of gases mentioned above. Corresponding conditions will apply to any other gas that is chosen to be adjusted.

Hospital use:

Volatile general anaesthetics are known to be harmful to the health of the people working in the environment of the equipment and of the patients subjected to the anaesthetics. Therefore, in situations where volatile general anaesthetics such as nitrous oxide, chloroform, diethyl ether, isoflurane, enflurane, methoxyflurane and halothane or other halogenated anaesthetics are used the principle of the present invention can be applied both with respect to the equipment supplying the gases and to the chamber in which the operation on the patient is performed. In addition, the subject for the anaesthesia may be enclosed completely or partly enclosed in a housing according to the invention.

Diving:

Already at a total pressure of approximately 400 kPa as found for offshore workers submerged at 30 meters below the surface breathing compressed air problems can occur for the divers when they approach the surface despite the diving tables supplied to the divers. This leads to diving sickness that can be fatal for the diver if not treated immediately in a pressure chamber. In this connection, the housing according to the invention comprising a double wall could be applied in a suitable manner, to the pressure chambers to improve the known technology to the benefit of the diver's health. A more common complication is necrosis capiris femoris for divers supposedly caused by multiple decompressions. To counteract a too high localized partial pressure of nitrogen when the diver is rising abruptly, a double-wall clothing enclosing gas permeable contact with the divers body could be applied (cf. the principle of the gloves above), the intervening space generated in the clothing being flushed with a gas mixture having a partial pressure of nitrogen (and a total pressure adapted to the situation in the diver) adapted to ensure that there will be a positive flux of nitrogen from the diver's body into the intervening space but at a regulated rate which could be established by measuring equipment constantly measuring or monitoring the total pressure and regulating the gas partial pressure in the intervening space accordingly so that a balanced difusion of dissolved nitrogen would occur, counteracting any precipitation of air bubble embolia.

Welding industry:

In the welding industry, especially when welding easily oxidizing material e.g. aluminum, magnesium, no oxygen is desired since oxygen combined with heat will simply burn the metal leaving no material left when heated. Therefore welding there materials can only be made using an inert gas such as compressed argon. The biological disadvantage is that argon in combination with metal gases has been shown to produce lung carcinomas, and therefore pollution of argon to the environment should be avoided and the workers should be protected from the exposure to argon. Accordingly, the welding process should preferably be performed by the method according to the present invention.

Buildings

In buildings in Scandinavia and in North America radon diffuses from the earth crust leaving high concentrations of argon or radon in the cellars of buildings. This could also contribute to an increase in frequency of lung cancer such as small cell lung carcinomas seen in these countries. The exposure to radon and argon arising from the cellars of buildings could be decreased by creating a housing according to the invention with an intervening space substantially enclosing the chambers to be protected or the double wall could also be placed beneath the floors on buildings where high concentrations of such gases are present and thereby function as a gas collector between the floors, preferably beneath the cellar of the building. Exposure to argon can also be decreased in a similar way.

Freon

Collecting freon from the plastic industry, (e.g. from the production of styrophoam) and old refrigerators contribute the degradation of the ozone layer. Despite the use of collecting tanks, the outlet of freon to the environment continues. Accordingly, the collecting of freon should preferably be performed by the method according to the present invention.

LIST OF REFERENCES TO THE DRAWINGS 1. first chamber walls
2. first chamber
3. second chamber walls
4. second chamber
5. second chamber walls
6. gas inlet
7. central gas supply
8. gas bottle
9. gas flow measuring means
10. central control unit
11. valve
12. gas outlet
13. flow measuring means
14. valve
15. recycling of gas
16. means for measuring gas partial pressure
17. gas inlet
18. gas supply
19. gas bottle
20. flow measuring means
21. gas supply valve
22. gas outlet 23. gas flow measuring means
24. valve
25. means for measuring gas partial pressure
26. means for measuring total gas pressure
27. means for measuring the total gas pressure of the gas and/or for measuring the partial pressure
28. feed-back regulation
29. alarm means
30. display
31. illumination systems
32. gas compressor
33. gas compressor
34. gas compressor
35. filtering system
36. glove cuffs
37. glove cuffs
38. releaseable wall part
39. releaseable wall part
40. glove shaped parts of the first chamber walls
41. seal
42. flexible glove shaped wall parts of the second chamber wall
43. seal
44. transparent material of the first chamber walls
45. transparent material of the second chamber walls
46. plug means
50. means for measuring the total gas pressure of the gas and/or for measuring the partial pressure
51. computer unit References Chapman J. D.: "The detection and measurement of hypoxic cells in solid tumors". Cancer 54: 2441–2449, 1984.

Clark A. Jr., Clark P. A. A., Connett R. J., Gayeski T. E. J. and Honig C. R.: "How large is the drop in $PO_2$ between cytosol and minochondrion?". AM J. Physiol. 252 (Cell Physiol 21): C583–C587, 1987.

Derrick J. R. and Russell D.: "Oxygen tensions in tissues". Arch Surg. (Chicago) 88: 1059–1062, 1964.

Ebbesen P., Toth F. D., Villadsen J. A. and Nørskov-Lauritsen N. "In vitro interferon and virus production at in vivo physiological oxygen tensions". In Vivo 5, 355–558, 1991.

Ebbesen P., Hager H., Aboagye-Mathiesen G., Petersen P. M., Lützhøft J., Villadsen, J. A., Zdravkovic M., Nørskov-Lauritsen N., Dalsgaard A. M. and Zachar V.: "Physiologic oxygen tension is relevant to MHC-1 expression, spontaneous transformation and interferon response of in vitro aging murine fibroblasts". In press, 1993.

Gayeski T. E. J., Connett R. J. and Honig C. R.: "Minimum intracellular $PO_2$ for maximum cytochrome turnover in red muscle in situ". AM J. Physiol 252: H906–H915, 1987.

Hochachka P. W.: "Defence strategies against hypoxia and hypothermia". Science 231 : 234–241, 1986.

Jones D. P.: "Intracellular diffusion gradients of $O_2$ and ATP". AM J. Physiol. 250 (Cell Physiol 19): 663–C675, 1986.

J. Immunol. 138:55;1987

Loeffler D. A., Junea P. L. and Heppner G. H.: "Natural killer cell activity under conditions reflective of tumor micro-environment". Int. J. Cancer 48(6): 895–899, 1991. Biological background of the invention.

Nature 288:373;1980

Schrumphe A., Adler I. and Deckwer W. D.: "Solubility of oxygen in electrolyte solutions". Biotechnol. Bioeng. 20: 145–150, 1978.

Science 257:401;1992

Shaw D. H. and Pace D. M.: "Recovery of cells in vitro from the effects of hypoxia and hyperoxia". J. Cell Physiol. 73: 119–124, 1969.

Spier R. E. and Griffiths, B.: "An examination of the data and concepts gemane to the oxygenation of cultured animal cells". Develop. Biol. Standards 55: 81–92, 1984.

Stem M. D., Chien A. M., Capogrossi M. C., Pelto D. J. and Lakatta E. G.: "Direct observation of the "oxygen paradox" in single rat ventricular myocytes". Circ. Res. 56: 899–903, 1985.

We claim:

1. A method for performing, at a particular partial pressure of a selected gas species in a gaseous atmosphere or at a particular total gas pressure of a gaseous atmosphere, an operation involving a material, comprising performing the operation in a housing comprising i) first chamber walls defining a first chamber containing a gaseous atmosphere and ii) second chamber walls defining a second chamber substantially enclosing the first chamber, the second chamber containing a gaseous atmosphere between said first and second chamber walls, the operation being performed in said first chamber while a) the partial pressure of the selected gas species or the total gas pressure in the atmosphere of the second chamber is lower than the partial pressure of the selected gas species or the total gas pressure, respectively, in the gaseous atmosphere in the first chamber, and b) the partial gas pressure of the selected gas species or the total gas pressure in the atmosphere of the second chamber is lower than the partial pressure of the selected species or the total gas pressure, respectively, of the gaseous atmosphere in an adjacent outer third chamber or space, and c) the partial pressure of the selected gas species of the first chamber is the same or lower than the partial pressure of the selected gas species in the gaseous atmosphere in the adjacent outer third chamber or space, or the total gas pressure in the atmosphere of the first chamber is the same or lower than the total gas pressure in the gaseous atmosphere in the adjacent outer third chamber or space.

2. A method according to claim 1, wherein the material is a non-gaseous material.

3. A method according to claim 1, wherein the gaseous atmosphere of the outer third chamber or space is the ambient atmosphere (air).

4. A method according to claim 1, wherein the operation is performed at a particular partial pressure of a selected gas species in the atmosphere of the first chamber, the ratio between the partial pressure of the selected gas species in the second chamber and the partial pressure of the selected gas species in the first and in the adjacent outer third chamber or space chamber being at the most 0.99.

5. A method according to claim 1, wherein one or several gases are supplied to the first chamber, the composition and/or flow of the gas or gases supplied being adapted to provide the particular partial pressure.

6. A method according to claim 1, wherein gas is removed from the second chamber, the composition and/or flow of the gas removed being adapted to provide the particular partial pressure of the selected gas in the first chamber.

7. A method according to claim 1, wherein one or several gases is/are supplied to the first chamber, and gas is removed from the second chamber, the composition and/or flow of the gas or gases supplied and the gas removed, respectively, being adapted to provide the particular partial pressure of the selected gas in the first chamber.

8. A method according to claim 1, wherein gas is removed from both the first chamber and the second chamber, the composition and/or flow of each of the gases removed being adapted to provide the particular partial pressure of the selected gas in the first chamber.

9. A method according to claim 1, wherein one or several gases is/are supplied to the housing, and gas is removed from the housing, the composition and flow of the gas or gases supplied and the gas removed, respectively, being adapted to provide the particular partial pressure of the selected gas in the first chamber.

10. A method according to claim 9 wherein the selected gas is a gas which is present in the ambient atmosphere at a partial pressure higher than the predetermined partial pressure of the selected gas species in the first chamber.

11. A method according to claim 10, wherein one or several gases is/are supplied which has/have a lower molar concentration of the selected gas species than the molar concentration corresponding to the predetermined partial pressure of the selected gas species in the first chamber.

12. A method according to claim 11, wherein the gas or gases supplied is/are substantially free from the selected gas species.

13. A method according to claim 10, wherein gas is removed which contains the selected gas species.

14. A method according to any of claim 9, wherein the selected gas is a gas present in the ambient atmosphere at a partial pressure lower than the predetermined partial pressure of the selected gas species in the first chamber and the total gas pressure in the atmosphere of the first chamber is lower than the total gas pressure in the gaseous atmosphere in the adjacent outer third chamber or space.

15. A method according to claim 14, wherein one or several gasses is/are supplied which has/have a higher molar concentration of the selected gas species than the molar concentration corresponding to the predetermined partial pressure of the selected gas species in the first chamber.

16. A method according to claim 15, wherein a gas is supplied which substantially consists of the selected gas species.

17. A method according to claim 14, wherein gas is removed which has a lower molar concentration of the selected gas than the molar concentration corresponding to the predetermined partial pressure of the selected gas species in the first chamber.

18. A method according to claim 9, wherein the operation is performed at an oxygen partial pressure of lower than ambient oxygen partial pressure.

19. A method according to claim 18, wherein the oxygen partial pressure in the first chamber is at the most 18 kPa.

20. A method according to claim 18, wherein the oxygen partial pressure in the first chamber is at the most 6 kPa.

21. A method according to claim 18, wherein, the oxygen partial pressure in the first chamber is at the most 2 kPa.

22. A method according to claim 1, wherein the first chamber walls comprise a wall part of a material which permits gas diffusion between the chambers.

23. A method according to claim 22, wherein the material is a membrane which selectively or preferentially permits diffusion of particular gas species or a particular gas species.

24. A method according to claim 1, wherein the material in the first chamber comprises or develops an airborne toxic or noxious substance, and the toxic or noxious substance is substantially prevented from escaping into said adjacent outer third chamber or space by being trapped in the second chamber and removed from the second chamber.

25. A method according to claim 1, wherein the material is biological material, including biological analogues material, cells and cell components.

26. A method according to claim 1, wherein gas or an airborne substance material present in the first chamber is substantially prevented from escaping into said adjacent outer third chamber or space by being trapped in the second chamber and removed from the second chamber.

27. A method according to claim 1, wherein gas and/or an airborne material from said adjacent outer third chamber or space is substantially prevented from percolate into the first chamber by being trapped in the second chamber and removed from the second chamber.

28. A housing, in particular for housing a material while an operation involving the material is performed, the housing comprising first chamber walls defining a first chamber containing a first gaseous atmosphere; and second chamber walls defining, between said first and second chamber walls, a second chamber substantially enclosing the first chamber and containing a second gaseous atmosphere; and means for maintaining
   a) the partial pressure of a selected gas species or the total gas pressure in the atmosphere of the second chamber lower than the partial pressure of the selected gas species or the total gas pressure, respectively, in the gaseous atmosphere in the first chamber, and means for maintaining
   b) the partial gas pressure of the selected gas species or the total gas pressure in the atmosphere of the second chamber lower than the partial pressure of the selected gas species or the total gas pressure, respectively, of the gaseous atmosphere in an adjacent outer third chamber or space, and means for maintaining
   c) the partial pressure of the selected gas species of the first chamber lower than or the same as the partial pressure of the selected gas species in the gaseous atmosphere in the adjacent outer third chamber or space, or means for maintaining the total gas pressure in the atmosphere of the first chamber lower than or the same as the total gas pressure in the gaseous atmosphere in the adjacent outer third chamber or space.

29. A housing according to claim 28 where the material is a non-gaseous material.

30. A housing according to claim 28, which is adapted for housing a biological material or a material analogous thereto, including living cells and cell components, while performing operations on the material.

31. A housing according to claim 30, wherein the third chamber or space is the ambient atmosphere (air).

32. A housing according to claim 31, wherein opposite parts of the first and second chamber walls are flexible.

33. A housing according to claim 32, wherein the flexible wall parts protrude or may be caused to protrude into the first chamber so as to allow manipulation of means or objects within the first chamber from a position outside the second chamber walls.

34. A housing according to claim 33, wherein the flexible wall parts are glove shaped.

35. A housing according to claim 28, wherein opposite parts of the first and second chamber walls are transparent.

36. A housing according to claim 28, wherein each of the first and second chamber walls comprise mutually oppositely arranged first and second releaseable wall parts.

37. A housing according to claim 28, wherein the means for maintaining a lower total or partial gas pressure in the second chamber comprise means for supplying a gas into the first chamber.

38. A housing according to claim 28, wherein the means for maintaining a lower total or partial gas pressure in the second chamber comprise means for removing gas from the second chamber.

39. A housing according to claim 28, wherein the means for maintaining a lower total or partial gas pressure in the second chamber comprise means for supplying a gas into the second chamber.

40. A housing according to claim 28, which additionally comprises means for removing gas from the first chamber.

41. A housing according to claim 28, wherein means for removing a gas species by chemical conversion of the gas are provided in the first and/or the second chamber.

42. A housing according to claim 41, wherein the means for removing a gas species by chemical conversion comprises a catalyst.

43. A housing according to claim 28, wherein the means for maintaining a difference in gas pressures comprise gas inlets and/or outlets extending through and being sealingly connected to the second chamber walls.

44. A housing according to claim 43, wherein the means for maintaining a difference in gas pressures further comprise remotely controlled valve means for controlling gas flow through said gas inlets and/or outlets.

45. A housing according to claim 28, wherein the means for maintaining a difference in gas pressures comprise inlets and/or outlets extending through and being sealingly connected to the first and second chamber walls.

46. A housing according to claim 28, wherein means for measuring the partial pressure or concentration of a gas is arranged connected to the first and/or second chamber.

47. A housing according to claim 28, wherein the means for maintaining a difference in gas pressures further comprise alarm means which is operated when the gas composition measured exceeds a predetermined limit.

48. A housing according to claim 28, wherein the second chamber comprises radiation means for inactivating or neutralizing biological activity in any biological material present in the second chamber.

49. A housing according to claim 28 wherein the second chamber constitutes one continuous space.

50. A housing according to claim 28 wherein the second chamber substantially encloses the first chamber walls except for inlets and outlets extending through the second chamber.

51. A housing according to claim 28, wherein the depth of the wall is between 1–1000 mm.

52. A housing according to claim 28, wherein the ratio between the volume of the second chamber and the volume of the first chamber is in the range of 10:1–1:1000.

53. A housing according to claim 28, wherein the second chamber constitutes a volume which allows laminar flow of the gas contained therein.

54. A garment, in particular a glove, comprising a double layered flexible material comprising a first layer of a first flexible material and a second layer of a second flexible material, the first and second layer defining a space therebetween containing a gaseous atmosphere and means for maintaining a lower total pressure of a gas or a lower partial pressure of a selected gas species within the inner space defined by the first and second layers compared to the outer space of the garment, and the inner space comprising a third flexible material being a material which prevents the first and second layer from collapsing against each other.

* * * * *